United States Patent
Robins et al.

(10) Patent No.: US 9,649,817 B2
(45) Date of Patent: May 16, 2017

(54) FORMING PRESSES AND METHODS FOR FORMING JOGGLED, STIFFENED COMPOSITE STRUCTURES

(71) Applicant: The Boeing Company, Huntington Beach, CA (US)

(72) Inventors: Brian Gregory Robins, Renton, WA (US); Silas Lawton Studley, Seattle, WA (US); Darrell Darwin Jones, Mill Creek, WA (US); Brad Andrew Coxon, Everett, WA (US)

(73) Assignee: The Boeing Company, Chicago, IL (US)

( * ) Notice: Subject to any disclaimer, the term of this patent is extended or adjusted under 35 U.S.C. 154(b) by 357 days.

(21) Appl. No.: 14/336,969

(22) Filed: Jul. 21, 2014

(65) Prior Publication Data

US 2016/0016366 A1    Jan. 21, 2016

(51) Int. Cl.
| | |
|---|---|
| *B29C 43/02* | (2006.01) |
| *B29C 45/76* | (2006.01) |
| *B29C 70/46* | (2006.01) |
| *B29C 43/20* | (2006.01) |
| *B29C 70/54* | (2006.01) |
| *B29C 33/30* | (2006.01) |
| *B29C 43/36* | (2006.01) |

(52) U.S. Cl.
CPC ............ *B29C 70/46* (2013.01); *B29C 33/308* (2013.01); *B29C 43/203* (2013.01); *B29C 43/36* (2013.01); *B29C 70/462* (2013.01); *B29C 70/543* (2013.01); *B29C 2043/3605* (2013.01)

(58) Field of Classification Search
CPC ..... B29C 70/46; B29C 70/462; B29C 70/543; B29C 33/308; B29C 43/203
USPC ........................................ 425/394, 356, 423
See application file for complete search history.

(56) References Cited

U.S. PATENT DOCUMENTS

| | | | |
|---|---|---|---|
| 7,401,487 B2 * | 7/2008 | Tiprigan ................ | B21D 11/18 72/301 |
| 7,708,546 B2 | 5/2010 | Lee et al. | |

(Continued)

FOREIGN PATENT DOCUMENTS

| | | |
|---|---|---|
| CA | 2 487 697 | 5/2006 |
| CA | 2 487 738 | 5/2006 |
| DE | 10 2010 026 466 | 1/2012 |

OTHER PUBLICATIONS

European Patent Office, Extended European Search Report issued in related pending European Patent Application No. 15 17 0418, Dec. 8, 2015.

(Continued)

*Primary Examiner* — Joseph S Del Sole
*Assistant Examiner* — Thukhanh T Nguyen
(74) *Attorney, Agent, or Firm* — DASCENZO Intellectual Property Law, P.C.

(57) ABSTRACT

Apparatuses and methods for forming a joggle and a longitudinal ridge in a multi-ply composite charge are disclosed. Charges may be formed in a forming press that comprises a joggled die, with a longitudinal ridge and a joggle that crosses the longitudinal ridge, and a conforming die, with a series of longitudinally-spaced die fingers. The die fingers include pairs of die members configured to move laterally between a closed position and an open position, with each die member configured to tilt longitudinally.

20 Claims, 5 Drawing Sheets

(56) References Cited

U.S. PATENT DOCUMENTS

| | | |
|---|---|---|
| 8,557,165 B2 | 10/2013 | Jones et al. |
| 8,601,694 B2 | 12/2013 | Brennan et al. |
| 2012/0076989 A1 | 3/2012 | Bland |
| 2013/0049258 A1 | 2/2013 | Rotter et al. |
| 2013/0340928 A1 | 12/2013 | Rotter et al. |

OTHER PUBLICATIONS

Machine-generated English translation of DE 10 2010 026 466, downloaded from espacenet.com on Jan. 28, 2016.

\* cited by examiner

FORMING PRESSES AND METHODS FOR FORMING JOGGLED, STIFFENED COMPOSITE STRUCTURES

FIELD

The present disclosure relates to forming presses and methods for forming joggled, stiffened composite structures.

BACKGROUND

Parts such as stiffened composite structures (e.g., stringers) formed from laminated composites may be fabricated using a flat multi-ply charge of prepreg materials. The charge may be formed into a desired part shape using a forming press having mating dies that compress and form the charge into the desired shape, which is normally a straight or smoothly contoured shape with a longitudinal ridge. However, using a forming press may present difficulties when attempting to form joggles in the composite structure because of the tendency of the plies to form wrinkles as the charge is being compressed near a joggle detail, in particular when that joggle detail crosses the longitudinal ridge. Unchecked wrinkles may necessitate repairing, reworking, and/or scrapping the composite structure.

A joggle is a local offset in the global contour of a surface, i.e., the global contours on either side of a joggle are approximately parallel. A joggle includes two bends, or changes in local contour, that are opposite each other and relatively close to each other. For example, in a sheet-like structure, a joggle is an offset bend consisting essentially of two opposite bends, each less than 90°, separated by a neutral web.

Present solutions to avoid wrinkles in joggled, stiffened composite structures include adding pre-cure patches to reinforce wrinkled sections and using hand lay-up techniques in which each ply is laid up by hand over a die or other tool in order to reduce the possibility of wrinkling. These techniques are material intensive (and thus costly and result in heavy parts), labor intensive (and thus costly), and/or relatively slow.

A further problem with current techniques for forming joggled, stiffened composite structures is the limited flexibility of existing forming machines to accommodate differing part shapes that are joggled. Since the tooling normally has a permanent shape that may not be easily altered, separate tooling dies must be fabricated to accommodate differing part shapes (e.g., different positions and bends along a structural member).

Accordingly, there is a need for methods and apparatuses for forming joggled, stiffened composite structures that reduce and/or eliminate wrinkling during the forming process. There is also a need for apparatuses for forming joggles in stiffened composite structures that are easily reconfigurable to form parts having differing shapes.

SUMMARY

Joggled, stiffened composite structures may be formed with a forming press of the present disclosure. Forming presses are configured to form, by pressing, a longitudinal ridge and a joggle that crosses the longitudinal ridge in a multi-ply composite charge. The forming presses comprise a joggled die, a conforming die, and a support frame that supports the dies. The joggled die is configured to form the joggled, longitudinal ridge in the charge, i.e., the joggled die has a die face with a die face longitudinal ridge and a die face joggle that crosses the die face longitudinal ridge. The conforming die is configured to conform to the shape of the joggled die and to press the charge to a substantially constant thickness. The conforming die includes a series of longitudinally-spaced die fingers and a die support that operatively supports the die fingers. Each die finger includes a pair of laterally-spaced die members. Each die member is configured to tilt longitudinally, configured to translate transversely, and biased transversely toward the joggled die. Further, the pair of die members of each die finger is configured to move laterally between a closed position and an open position. The die members of a die finger may be laterally biased toward each other. Hence, die members generally are configured to longitudinally tilt, transversely translate, and laterally translate.

The forming press, the joggled die, and the conforming die may be configured to avoid and/or eliminate wrinkles in the charge as the charge is pressed between the dies. The motion and bias of the die members of the conforming die may apply tension to the charge in proximity of the contour changes of the joggled die (e.g., the die face joggle and the die face longitudinal ridge). Tension across local contour changes tends to avoid wrinkling and/or to eliminate wrinkles in the charge.

DESCRIPTION

Figure 1:
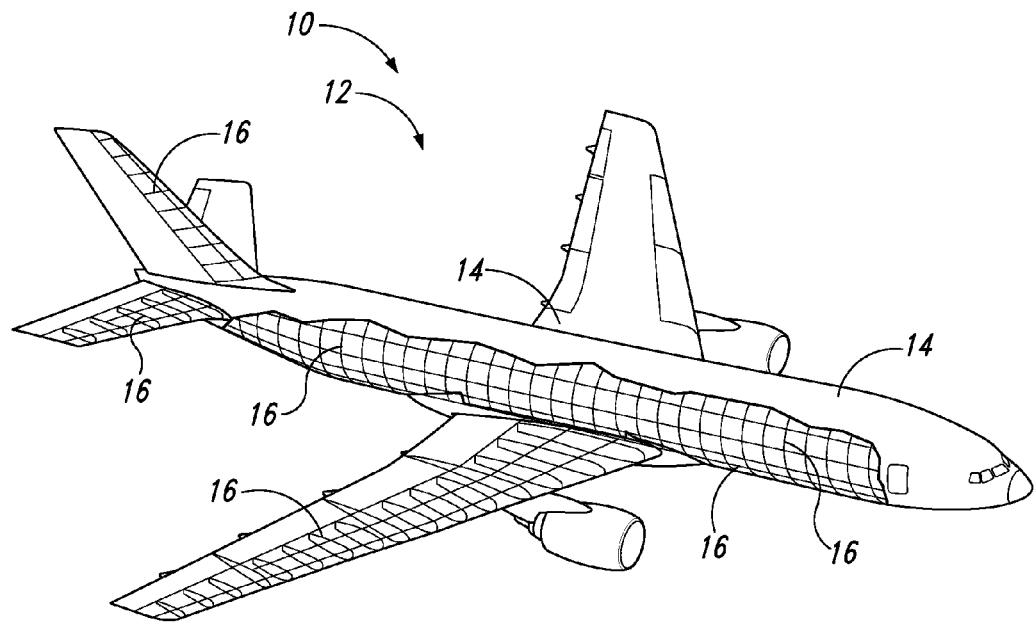
FIG. 1 is a partial skeletal view of an illustrative, non-exclusive example of an aircraft that incorporates one or more stiffened composite structures.

Systems and methods for forming joggled, stiffened composite structures, as well as apparatuses that include joggled, stiffened composite structures, are disclosed herein. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled in each of the figures, but reference numerals associated therewith may be used for consistency. Elements, components, and/or features that are discussed with reference to one or more of the figures may be included in and/or used with any of the figures without departing from the scope of the present disclosure.

In FIG. 1, an example of an apparatus 10 (also called a construction) that may be constructed with joggled, stiffened composite structures 16 is provided in the form of an aircraft 12; however, other apparatuses 10 are within the scope of the present disclosure, and the present disclosure is not limited to aircraft and aircraft applications. For example, as illustrative, non-exclusive examples, other apparatuses 10 that may include joggled, stiffened composite structures 16 include (but are not limited to) spacecraft, watercraft, land vehicles, wind turbines, structural towers and masts, roofing material, etc. Moreover, aircraft 12 may take any suitable form, including commercial aircraft, military aircraft, private aircraft, or any other suitable aircraft. While FIG. 1 illustrates aircraft 12 in the form of a fixed wing aircraft, other types and configurations of aircraft are within the scope of aircraft 12 according to the present disclosure, including (but not limited to) helicopters.

Apparatuses 10 generally encompass structures that include a joggled, stiffened composite structure 16 and a skin 14 (also described as a supported structure and/or a support structure) that is operatively coupled to and supported by the joggled, stiffened composite structure 16. Illustrative, non-exclusive examples of joggled, stiffened composite structures 16 are frame members, stringers, spars, ribs, beams, and/or supports. Though skin 14 typically is a sheet-like structure, such as the aircraft skin illustrated in FIG. 1, skin 14 may be any suitable structure, such as a panel, a wall, a floor, a frame, a column, etc.

Joggled, stiffened composite structures 16 typically are elongated with a longitudinal direction. FIGS. 2-8 include a coordinate frame 100 that indicates the orientation of two or three of the perpendicular directions used herein: the longitudinal direction (indicated as the x-direction), the lateral direction (indicated as the y-direction), and the transverse direction (indicated as the z-direction). For consistency, even where the illustrated structures are not necessarily elongate, the x-direction is referred to as the longitudinal direction.

Figure 2:
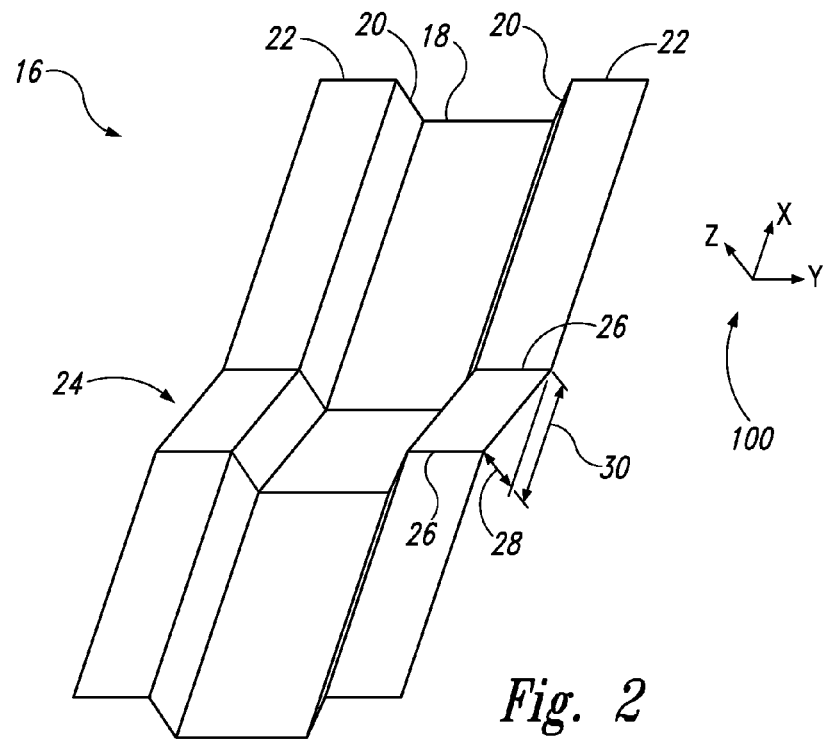
FIG. 2 is a schematic representation of a joggled, stiffened composite structure.

As illustrated in FIG. 2, joggled, stiffened composite structures 16 include a longitudinal ridge 18. The longitudinal ridge 18 is configured to stiffen the overall composite structure as compared to a similar structure without any longitudinal ridge. The joggled, stiffened composite structure 16 is described as stiffened even when the structure is in a pliable, uncured, and/or partially cured state. The longitudinal ridge 18 is a structure that substantially, and/or completely, spans the longitudinal dimension of the joggled, stiffened composite structure 16 and generally is laterally centered along the joggled, stiffened composite structure 16. The longitudinal ridge 18 protrudes and/or extends in the transverse direction. The joggled, stiffened composite structure 16 may include one or more longitudinal flanges 22, typically two flanges along opposite edges of the longitudinal ridge 18. The longitudinal ridge 18 may include spaced-apart side walls 20. The joggled, stiffened composite structure 16 may form a predetermined profile in cross section, such as a hat profile, as illustrated in FIG. 2, with the flanges 22 corresponding to the brim and the longitudinal ridge 18 corresponding to the crown of the hat. The profile of the joggled, stiffened stringer of FIG. 2 may also be referred to as a flanged, open trapezoidal profile, with the open trapezoidal portion corresponding to the longitudinal ridge 18. Other examples, include a rounded profile, a triangular profile, a rectangular profile, etc. that correspond to rounded, triangular, rectangular, etc. longitudinal ridges 18.

Joggled, stiffened composite structures 16 include one or more joggles 24 which may be configured to accommodate local variations in the skin 14, skin ramps, and/or lap joints at the junction of skin 14 sections. Joggle 24 is a local offset in the global contour of a surface (e.g., an offset crossing a plane). That is, the global contours on either side of joggle 24 are approximately parallel. Joggle 24 includes two bends 26, or changes in local contour, that are opposite each other and relatively close to each other. Joggle 24 may be characterized by a joggle offset 28, the perpendicular distance between the global contours on either side of the joggle 24. Joggle 24 also may be characterized by a joggle length 30, the distance between the bends 26 as measured along the global contour on either side of the joggle 24. Typically, the joggle length 30 is substantially larger than the joggle offset 28, yet still generally a small feature in the whole joggled, stiffened composite structure 16. The joggle length 30 may be 2-20, 2-10, and/or 2-5 times the joggle offset 28. The joggle offset 28 may be large enough to fit over skin thickness variations, skin ramps, and/or lap joints (i.e., typical joggle offsets 28 may be from a fraction of a skin thickness to one or more skin thicknesses). For example, the joggle offset 28 may be less than 15 mm, less than 10 mm, less than 8 mm, less than 6 mm, less than 5 mm, less than 4 mm, less than 3 mm, less than 2 mm, greater than 0.5 mm, greater than 1 mm, greater than 2 mm, greater than 3 mm, greater than 4 mm, greater than 5 mm, greater than 6 mm, greater than 8 mm, and/or greater than 10 mm. As another example, the joggle length 30 may be less than 300 mm, less than 200 mm, less than 150 mm, less than 100 mm, less than 80 mm, less than 50 mm, greater than 20 mm, greater than 50 mm, greater than 80 mm, greater than 100 mm, and/or greater than 150 mm.

The joggle 24 of the joggled, stiffened composite structure 16 is a transverse offset that laterally spans the joggled, stiffened composite structure 16. Hence, the joggle 24 crosses the longitudinal ridge 18. Thus, the joggled, stiffened composite structure 16 includes two types of deformations in the transverse direction: joggle 24, generally oriented in the lateral direction, and longitudinal ridge 18, oriented in the longitudinal direction.

Joggled, stiffened composite structures 16 may be formed from a multi-ply composite charge 34 (as shown in FIGS. 3-7) which may include one or more layers of uncured composite material, green composite material, partially-cured composite material, and/or prepreg composite material. Though the charge 34 is at least not fully cured, the joggled, stiffened composite structure 16 may be uncured, partially cured, or fully cured. Hence, when the charge 34 is formed as described herein, the formed charge 34 may also be described as the joggled, stiffened composite structure 16.

The multi-ply composite charge 34 generally is a pliable blank, generally elongated and generally flat. The charge 34 may include fiber-reinforced composite plies and may include carbon fiber, aramid fiber, and/or glass fiber.

As shown in FIGS. 3-7, the multi-ply composite charge 34 may be formed into the desired shape (with the longitudinal ridge 18 and the joggle 24 that crosses the longitudinal ridge 18, as seen in the example of FIG. 2) by a forming press 40, which also may be referred to as a die press and/or a forming machine. When attempting to form a joggle and a longitudinal ridge in a multi-ply composite charge, the plies of the charge may wrinkle in a conventional press, especially near the joggle and/or the longitudinal ridge. In contrast, forming press 40 is configured to form the longitudinal ridge 18 and the joggle 24 in the charge 34 while avoiding, eliminating, resisting, and/or reducing wrinkling of the charge 34, e.g., forming without, or with minimal or reduced, wrinkles and/or without wrinkling the charge 34. The resulting, formed charge 34 may have no wrinkles, or at least no wrinkles in proximity to the joggle 24 and/or the longitudinal ridge 18.

Figure 3:
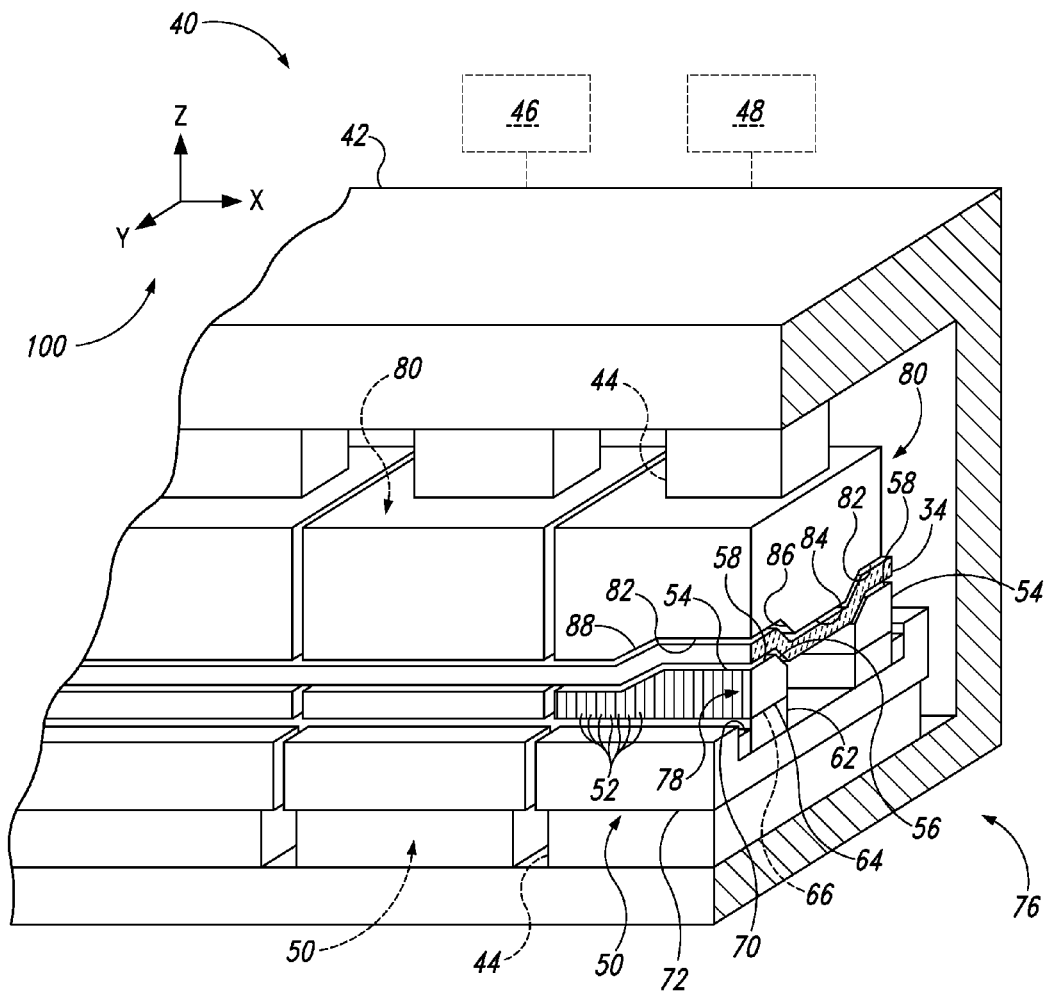
FIG. 3 is a schematic perspective view of a forming press with a formed charge.

With reference to FIG. 3, the forming press 40 is configured to accept the multi-ply composite charge 34 between one or more pairs of transversely opposed dies and to press the charge 34 between opposed dies. The forming press 40 includes a joggled die 80 and an opposed conforming die 50, both discussed further herein. These dies are configured to form the joggled, longitudinally ridged shape of the joggled, stiffened composite structure 16 and to form that shape while avoiding the formation of wrinkles and/or eliminating wrinkles in the charge 34. The forming press 40 and/or the two dies (the joggled die 80 and the conforming die 50) may be configured to concurrently form the longitudinal ridge 18 and the joggle 24 in the charge 34.

The forming press 40 may include further pairs of dies to impress shapes in other sections of the charge 34. For example, the forming press 40 may include two joggled die 80—conforming die 50 pairs, configured to form two joggles 24 along the same charge 34. As another example, the forming press 40 may include other die pairs configured to form other features (such as a longitudinal ridge 18 without any joggle) in other sections of the charge 34. As yet another example, the forming press 40 may include a plurality of conforming dies 50, one of which is configured to oppose the joggled die 80 and at least one of which is configured to oppose a conventional die for forming a longitudinal ridge 18 (without a joggle). Further, forming press 40 may be configured to interchange dies and, hence, may be configured to accept a joggled die 80 in a number of locations and/or to accept a conforming die 50 in a number of locations. Thus, the forming press 40 may be reconfigured to form a particular joggle 24 in a charge 34 and then a different joggle 24 in a different charge 34, where the joggles may differ in location, shape, and/or orientation.

The forming press 40 comprises at least one joggled die 80 and at least one conforming die 50, both supported by a support frame 42. The joggled die 80 and the conforming die 50 are configured to come together and to separate transversely. The forming press 40 may comprise one or more actuators 44 that may be configured to press the joggled die 80 and the conforming die 50 together, and/or to press the charge 34 between the joggled die 80 and the conforming die 50 to form the longitudinal ridge 18 and the joggle 24 in the charge 34. Actuators 44 may be configured to displace the joggled die 80 and the conforming die 50 individually (different actuators for different dies) or cooperatively (one or more actuators shared between two or more dies). Actuators 44 may be configured to separate the joggled die 80 and the conforming die 50. Actuators 44 may include motors, levers, gearing, hydraulics, etc., and may be manually and/or automatically operated. Moreover, the forming press 40 may comprise a controller 46 configured and/or programmed to control the operation of the forming press 40, the actuators 44, the joggled die 80, and/or the conforming die 50, and may be configured and/or programmed to perform the methods of use described herein.

Figure 4:
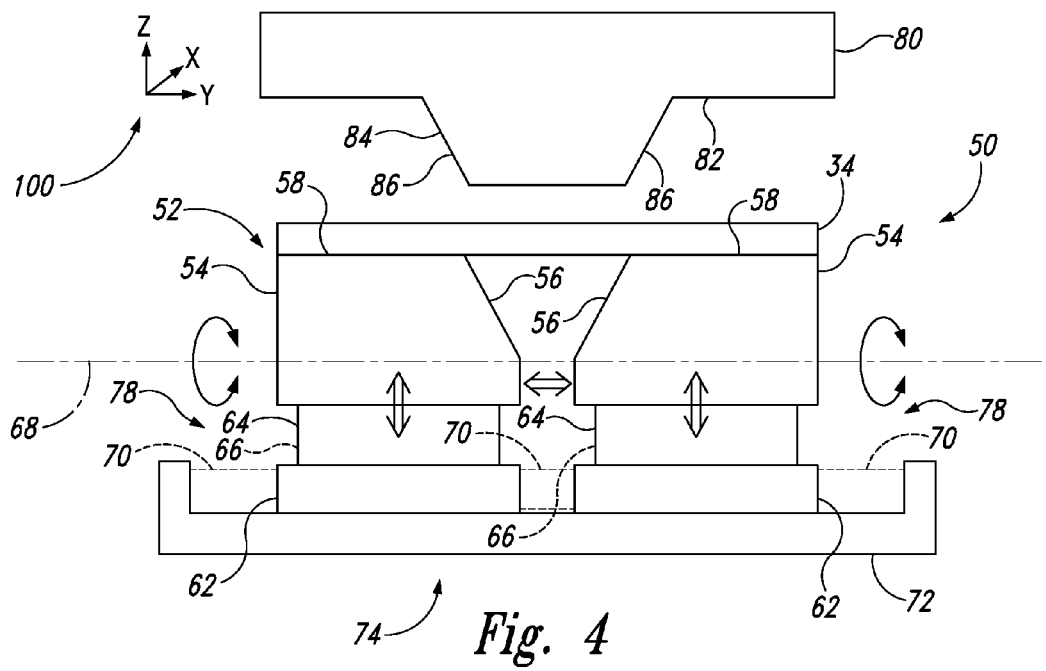
FIG. 4 is a schematic representation of a lateral view of a forming press with an unformed charge.
Figure 5:
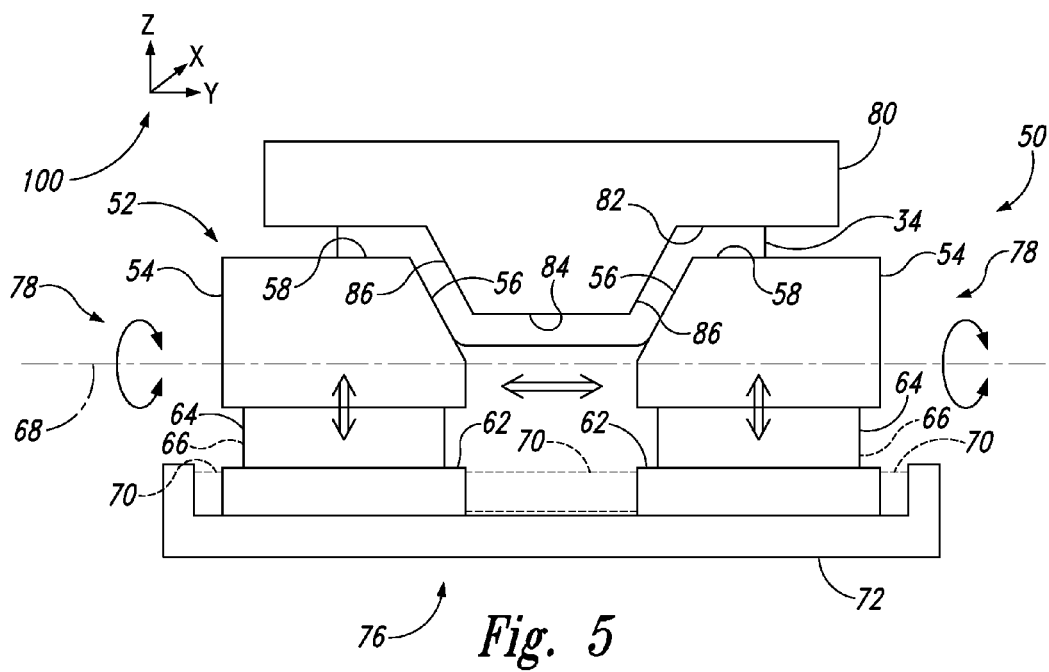
FIG. 5 is a schematic representation of a lateral view of a forming press with a charge being formed.
Figure 6:
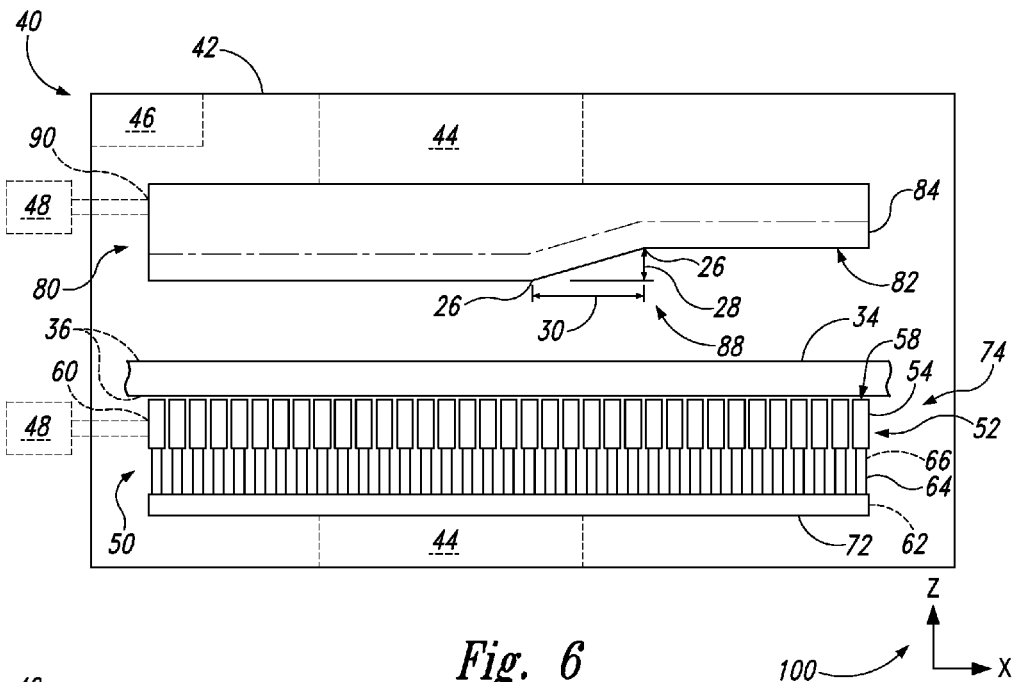
FIG. 6 is a schematic representation of a longitudinal view of a forming press with an unformed charge.
Figure 7:
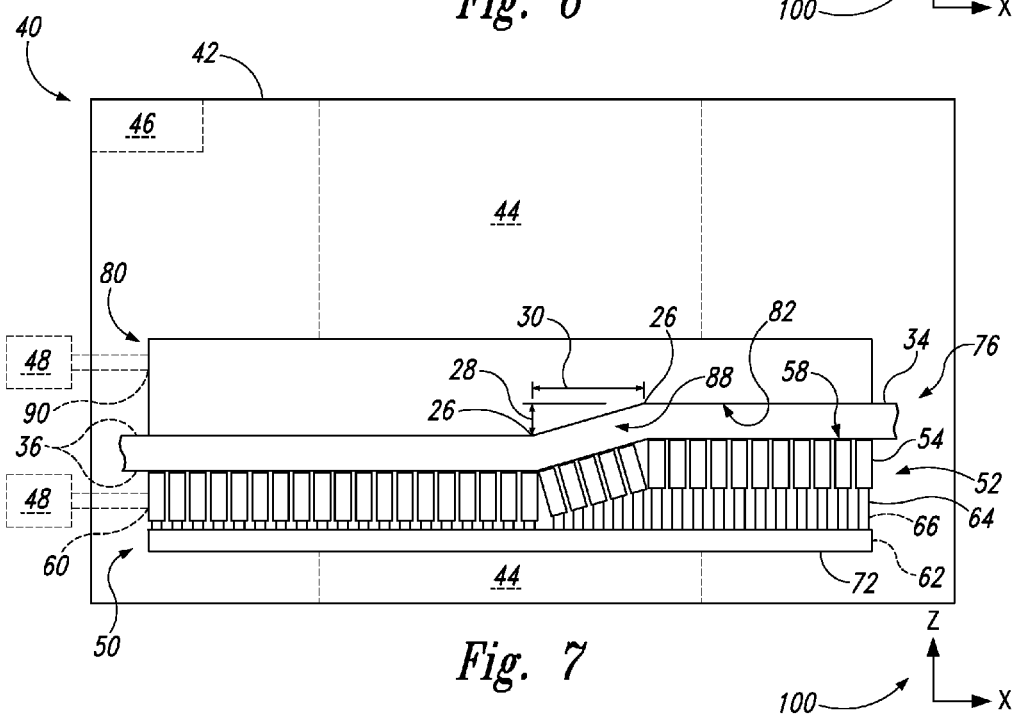
FIG. 7 is a schematic representation of a longitudinal view of a forming press with a charge being formed.

Further details of the dies and the operation of the forming press 40 may be understood with reference to FIGS. 4-7. FIGS. 4 and 6 show perpendicular views of the dies of the forming press 40 with the joggled die 80 and the conforming die 50 separated, and the (unformed) charge 34 proximate to the conforming die 50. FIGS. 5 and 7 show perpendicular views of the dies of the forming press 40 with the joggled die 80 and the conforming die 50 pressing the charge 34. Though FIGS. 3-7 show the illustrative, non-exclusive example of a joggled die 80, and a conforming die 50 configured to form a hat-shaped profile, the dies may be configured to form other profiles in the charge 34 as discussed further herein.

The joggled die 80 has a die face 82 (also called a joggled die face) that has a longitudinal ridge 84 (also called a die face longitudinal ridge) and a joggle 88 (also called a die face joggle) that crosses the longitudinal ridge 84. The longitudinal ridge 84 and the joggle 88 correspond to the shape of the joggled, stiffened composite structure 16. That is, the longitudinal ridge 84 and the joggle 88 have substantially the same shape as, and correspond to, the longitudinal ridge 18 and the joggle 24 respectively. The longitudinal ridge 84 of the joggled die face 82 includes two sides 86 that are spaced apart and that correspond to the spaced-apart side walls 20 of the longitudinal ridge 18 of the joggled, stiffened composite structure 16. The die face 82 is substantially rigid, that is, rigid enough to substantially maintain its shape when pressing the charge 34. Hence, the die face 82 and the joggled die 80 are configured to impress the shape of the longitudinal ridge 84 and the joggle 88 into the charge 34.

The die face 82 may be configured to release the charge 34 after pressing, for example to prevent or to at least restrict sticking of the charge 34 on the die face 82. Additionally or alternatively, the charge 34 may be pressed with a release film 36 interspersed between the charge 34 and the die face 82, as schematically and optionally represented in FIGS. 6-7. The optional release film 36 is a material that is configured to prevent or at least restrict sticking of the charge 34 on the die face 82 and to facilitate separation of the charge 34 from the die face 82. The die face 82 and/or the release film 36 may include, or may be substantially formed of, a material with low friction and/or low reactivity, for example a fluoropolymer, a polyoxymethylene, and/or a polyamide.

The die face 82 of the joggled die 80 may be configured to hold the charge 34 with vacuum force. That is, the die face 82 may be porous and/or gas permeable, and fluidically connected to an optional vacuum source 48, as schematically represented in FIGS. 6-7. The joggled die 80 may include a vacuum port 90 fluidically connected to the die face 82 and configured to connect to a vacuum source 48.

The conforming die 50 is configured to adapt to the shape of the joggled die face 82 and to establish a substantially constant thickness of the charge 34 when it is pressed between the two dies. Thus, though the die face 82 of the joggled die 80 generally defines the shape of the charge 34 when pressed, the conforming die 50 (in conjunction with the pressing force of the forming press 40) generally defines the thickness of the charge 34 when pressed. Hence, the joggled die 80 and the conforming die 50 together define the joggled, stiffened shape (and the cross sectional profile) of the joggled, stiffened composite structure 16.

As best seen in FIGS. 6-7, the conforming die 50 includes a series of longitudinally-spaced die fingers 52, each configured to oppose a portion of the joggled die 80 when pressing the charge 34 in the forming press 40. The conforming die 50 includes a die support 72 that operatively supports the die fingers 52. The die fingers 52 each include a pair of laterally-spaced die members 54, as best seen in FIGS. 4-5. Each of the die members 54 may include a die face 58 configured to oppose a portion of the joggled die 80.

Further, the conforming die 50 may include one or more die bases 62 that are coupled to the die support 72. Each die base 62 is configured to support at least one die member 54. The combination of a die base 62 and its supported die member(s) 54 may be referred to as a conforming die member assembly 78. At least one of the die members 54 of a die finger 52 may be coupled to a die base 62. Where both die members 54 of a die finger 52 are coupled to a die base 62, the members of the pair are coupled to different die bases 62. For example, each die member 54 may be coupled to a different die base 62. As another example, one die member of the pair of die members 54 of each die finger 52 may be coupled to one die base 62 and the other die member of the pair of die members 54 of each die finger 52 may be coupled to a different die base 62.

To oppose the joggled die 80 and its surface contours (e.g., the longitudinal ridge 84 and the joggle 88), the individual die members 54 are moveable and configured to translate in the transverse direction and to tilt in the longitudinal direction (as schematically represented by the doubled-ended arrows of FIGS. 4-5 near each die member 54). Additionally, at least one die member 54 of a die finger 52 is configured to translate in the lateral direction (as schematically represented by the double-ended arrows of FIGS. 4-5 between the two die members 54). Generally, both of the die members 54 of a die finger 52, and the corresponding die bases 62 and/or the conforming die member assemblies 78, are configured to translate laterally. The transverse translation and the longitudinal tilt are configured to accommodate the profile of the joggle 88, allowing adjustment for transverse differences due to the joggle offset 28 and surface orientation across the joggle length 30. The lateral translation is configured to accommodate the profile of the longitudinal ridge 84, allowing for lateral adjustment to create a recess 92 (in FIG. 5), or gap, between the die members that may accommodate the longitudinal ridge 84. For example, the shape of the recess 92 may be substantially the same shape as the longitudinal ridge 84.

The transverse displacement of a die member 54 may be passive and automatic, for example, being controlled by the amount of pressing between the joggled die 80 and the conforming die 50. For example, the die members 54 may be elastically coupled to a die base 62 and/or a die support 72 with one or more elastic, transverse couplers 64. The elastic, transverse couplers 64 may be configured to bias the corresponding die member 54 transversely toward the joggled die 80. Hence, as the joggled die 80 and the die member 54 are brought together, the elastic, transverse coupler 64 resists the relative motion of the joggled die 80 and the die member 54. The elastic, transverse couplers 64 may be, or may include, springs, air bladders, and/or similar compressible mechanisms.

The die member 54 may be coupled to, and/or may include, an alignment mechanism 66 (such as a shaft, a guide, a channel, a pivot, a rod, a pin, a tab, a groove, and/or a rail) that is configured to constrain the die member 54 to substantially displace transversely with respect to the die base 62 and/or the die support 72. The alignment mechanism 66 may be a part of the coupling between the die member 54 and the die base 62 and/or the die support 72. The alignment mechanism 66 may be configured to restrict lateral and/or longitudinal displacement of the die member 54 with respect to the die base 62, or with respect to the die support 72 if the die member 54 is not coupled to a die base 62. The alignment mechanism 66 may be coupled to the die member 54, the die base 62, and/or the die support 72 with a sliding and/or pivoting engagement.

The longitudinal tilt of a die member 54 may be passive and automatic, for example, being controlled by the amount of pressing between the joggled die 80 and the conforming die 50. The die members 54 may be pivotally coupled to a die base 62 and/or a die support 72, and may be configured to tilt longitudinally around a laterally-aligned tilt axis 68 (as schematically shown in FIGS. 4-5). Generally, the die members 54 are free to tilt around the tilt axis 68, and if biased, the die members 54 typically are biased to align their die faces 58 with the general contour of the opposing joggled die 80. When the joggled die 80 and the conforming die 50 are pressed together, the transverse bias of the die members 54 causes each die member 54 to tilt longitudinally to match the local contour of the opposed portion of the joggled die 80. Die members 54 may be configured to tilt longitudinally at an angle having an absolute value of less than 2°, less than 3°, less than 4°, less than 5°, less than 7°, less than 10°, greater than 1°, greater than 2°, greater than 3°, greater than 4°, and/or greater than 5°.

The die member 54 may be coupled to, and/or may include, an alignment mechanism 66 (such as a shaft, a guide, a channel, a pivot, a rod, a pin, a tab, a groove, and/or a rail) that is configured to constrain the die member 54 to substantially tilt longitudinally with respect to the die base 62 and/or the die support 72. Additionally, the alignment mechanism 66 may be configured to guide transverse displacement as described herein. Additionally or alternatively, a die member 54 may include at least two different alignment mechanisms 66, each dedicated to guide either transverse displacement or longitudinal tilt. The alignment mechanism 66 may be configured to restrict tilt around axes other than the tilt axis 68 and/or tilt in other directions.

Because each of the die fingers 52 of the conforming die 50 may longitudinally tilt and transversely displace, the conforming die 50 may conform to various shapes of the joggled die face 82 and/or to various joggled dies 80. For example, the conforming die 50 may be configured to conform to and to accommodate joggles 88 with different joggle lengths 30 and/or joggle offsets 28, and/or joggles 88 in different longitudinal locations along the joggled die face 82.

The lateral displacement of the die members 54 of a die finger 52 may be passive and automatic, e.g., being controlled by the amount of pressing between the joggled die 80 and the conforming die 50. Additionally or alternatively, the lateral displacement of one or more die members 54 may be actively controlled, e.g., by an actuator and/or by the action of the actuators 44 which press the joggled die 80 and the conforming die 50 together. At least one of the die members 54 of a die finger 52 is coupled to a die base 62 that is laterally coupled to the die support 72 and/or another die base 62 with a lateral coupler 70. For example, each die member 54 of a die finger 52 may be laterally, operatively coupled (through the corresponding die bases 62) with a different lateral coupler 70 to the die support 72. As another example, both die members 54 of a die finger 52 may be laterally, operatively coupled together (through the corresponding die bases 62) with a lateral coupler 70. The lateral coupler 70 may include, or may be, an elastic element (such as a spring, an air bladder, etc.), an actuator, and/or a mechanical linkage.

Each of the die fingers 52 is configured to transition between a closed position 74 (in FIG. 4), in which the laterally-spaced die members 54 are relatively close together, and an open position 76 (in FIG. 5), in which the laterally-spaced die members 54 are relatively further away from each other and define a recess 92 (in FIG. 5) therebetween that is configured to accept the charge 34 in contact with the longitudinal ridge 84 of the joggled die face 82. Each die finger 52 may independently transition between the closed position 74 and the open position 76. Additionally or alternatively, two or more of the die fingers 52 may transition cooperatively and/or simultaneously between the closed position 74 and the open position 76. The conforming die 50 may be described as in the closed position 74 or the open position 76 when all die fingers 52 are in the closed position 74 or the open position 76, respectively. Further, the transition between the closed position 74 and the open position 76 (of the die fingers 52 individually and/or collectively) may be in response to, and/or may be performed in conjunction with, transverse motion (pressing) of the joggled die 80 and/or conforming die 50 toward one another to press the charge 34 therebetween.

The die members 54 of a die finger 52 may be laterally biased toward each other, i.e., toward the closed position 74, and/or the lateral couplers 70 may be configured to resist a transition from the closed position 74 to the open position 76. Where the lateral couplers 70 are elastic and biased toward the closed position 74, the lateral couplers 70 may form a self-centering mechanism to align the die fingers 52 in the open position 76 around the longitudinal ridge 84 of the joggled die 80.

The conforming die 50 is configured to apply tension to the charge 34 as the charge 34 is pressed between the joggled die 80 and the conforming die 50. In particular, the conforming die 50 is configured to apply tension across the local contour changes of the joggled die face 82 (such as the bends 26 of the joggle 88 and around the longitudinal ridge 84). Tension across local contour changes tends to avoid wrinkling and/or to eliminate wrinkles in the charge 34 in the proximity of the local contour changes. The bias and motion of the die members 54 produces and/or maintains tension in the charge 34 in the proximity of the local contour changes. For example, in FIG. 7, the die fingers 52 on either side of the left bend 26 pull the charge 34 in opposite directions, thus applying tension. Similarly, the die fingers 52 on either side of the right bend 26 in FIG. 7 pull the charge 34 in opposite directions, thus applying tension. As another example, in FIG. 5, the die members 54 of a die finger 52 are laterally separated (in the open position 76) as the joggled die 80 and the conforming die 50 are pressed together. Thus, the charge 34 is pulled in opposite directions on opposite sides of the longitudinal ridge 84 and the charge 34 experiences tension across the longitudinal ridge 84.

Die members 54 may include a joggled die guide 56. The joggled die guide 56 generally extends from the die face 58 and tapers transversely away from the die face 58 and the joggled die 80. Joggled die guides 56 are configured to engage the charge 34 as the charge 34 is pressed to the conforming die 50 by the joggled die 80. More specifically, joggled die guides 56 are configured to engage the charge 34 in proximity of the longitudinal ridge 84 of the joggled die face 82. Joggled die guides 56 may be configured to oppose one of the sides 86 of the longitudinal ridge 84 of the joggled die face 82. Similarly, joggled die guides 56 may be configured to form a portion of one of the side walls 20 of the longitudinal ridge 18 of the joggled, stiffened composite structure 16. In particular, for a hat-shaped and/or an open trapezoidal profile of the joggled, stiffened composite structure 16, the joggled die guide 56 may define a notch at one end of the die face 58, e.g., the profile of the die member 54 may be a corner-notched rectangle with the joggled die guide 56 corresponding to the corner notch. For other profiles, the joggled die guide 56 generally has a shape corresponding to the shape of the longitudinal ridge 18 and/or one of the side walls 20. As examples, the joggled die guide may have an arcuate profile corresponding to a rounded longitudinal ridge 18 or a flat profile corresponding to a triangular longitudinal ridge 18. Where the joggled die guide 56 is configured to form a portion of the longitudinal ridge 18, the die face 58 may be configured to form a portion of the longitudinal flange 22.

The die face 58 of the die members 54 may be configured to release the charge 34 after pressing, for example to prevent or to at least restrict sticking of the charge 34 on the die face 58. Additionally or alternatively, the charge 34 may be pressed with a release film 36 interspersed between the charge 34 and the die face 58, as schematically and optionally represented in FIGS. 6-7. The optional release film 36 is the same type of release film 36 as discussed with respect to the die face 82 of the joggled die 80, i.e., the optional release film 36 is a material that is configured to prevent or at least restrict sticking of the charge 34 on the die face 58 and to facilitate separation of the charge 34 from the die face 58. The die face 58 and/or the release film 36 may include, or may be substantially formed of, a material with low friction and/or low reactivity, for example a fluoropolymer, a polyoxymethylene, and/or a polyamide.

The die face 58 of the die members 54 may be configured to hold the charge 34 with vacuum force. That is, the die face 58 may be porous and/or gas permeable and fluidically connected to an optional vacuum source 48, as schematically represented in FIGS. 6-7. The conforming die 50, the die fingers 52, and/or the die members 54 may include a vacuum port 60 fluidically connected to the die face(s) 58 and configured to connect to a vacuum source 48. The vacuum source 48 that optionally may be connected to the conforming die 50, and/or a subcomponent, may be the same or different vacuum source 48 that optionally may be connected to the joggled die 80, and/or a subcomponent.

Conforming dies 50 may correspond to, i.e., be configured to oppose, one or more joggled dies 80. Each die finger 52 has a longitudinal width that is the longitudinal width of the die members 54. Typically, each die member 54 has substantially the same longitudinal width and, hence, typically, the longitudinal width of a die finger 52 is the longitudinal width of the die members 54. The longitudinal width of the each die finger 52 may be substantially the same and may be substantially less than a longitudinal width of the corresponding joggled die(s) 80 and/or joggles 88. The longitudinal width of the die fingers 52 and/or the die members 54 may be less than 50%, less than 30%, less than 20%, less than 15%, less than 10%, greater than 5%, greater than 10%, greater than 15%, and/or greater than 20% of the longitudinal width of the joggled die 80 and/or the joggle length 30 of the joggle 88. The longitudinal width of each die finger 52 and/or each die member 54 independently may be at least 10 mm, at least 15 mm, at least 20 mm, at least 25 mm, at least 30 mm, at least 40 mm, at least 50 mm, at most 100 mm, at most 80 mm, at most 50 mm, at most 40 mm, and/or at most 30 mm. Conforming dies 50 may include at least 4, at least 5, at least 6, at least 7, at least 8, at least 10, at least 20, at most 50, at most 40, at most 30, at most 20, and/or at most 10 die fingers 52. Additionally or alternatively, die faces 58 may substantially span the entire longitudinal width of the die member 54, e.g., each die face 58 independently may have a longitudinal width of at least 10 mm, at least 15 mm, at least 20 mm, at least 25 mm, at least 30 mm, at least 40 mm, at least 50 mm, at most 100 mm, at most 80 mm, at most 50 mm, at most 40 mm, and/or at most 30 mm. Each die face 58 independently may have lateral width that is greater than its longitudinal width, e.g., a lateral width of at least 30 mm, at least 50 mm, at least 70 mm, at least 100 mm, at least 150 mm, at most 200 mm, at most 150 mm, and/or at most 100 mm.

Figure 8:
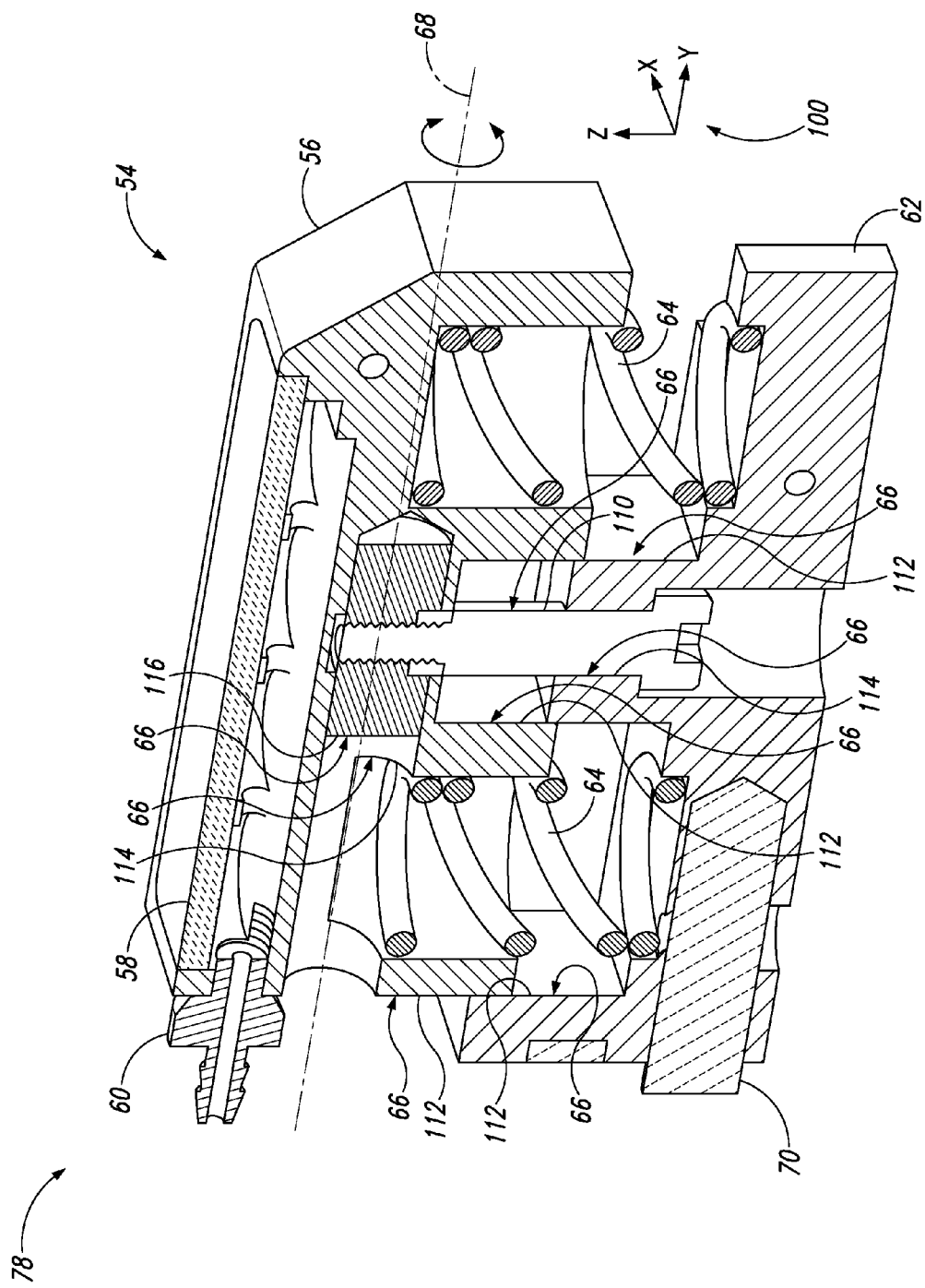
FIG. 8 is a partial, cross-sectional view of an illustrative, non-exclusive example of a conforming die.

FIG. 8 shows a cross-section of an illustrative, non-exclusive example of a conforming die member assembly 78. The conforming die member assembly 78 includes a die member 54, a die base 62 transversely, elastically coupled to the die member 54, and a group of alignment mechanisms 66 to constrain the motion of the die member 54 with respect to the die base 62. The die member 54 is elastically coupled by a matched pair of elastic, transverse couplers 64 (in the form of coil springs) to the die base 62. The springs are configured to bias the die member 54 and the die base 62 apart to resist transverse translation of the die member 54 toward the die base 62.

The die face 58 of the die member 54 is opposite the springs and the die base 62. Adjacent to the die face 58 is a joggled die guide 56 that tapers away from the die face 58 and that is configured to oppose one of the sides 86 of the longitudinal ridge 84 of the joggled die face 82. The die face 58 is substantially formed of a porous material such as a VYLON-brand porous polymeric sheet. Transversely beneath the die face 58 is a small chamber fluidically connected to a vacuum port 60 so that a vacuum may be drawn through the die face 58 and a multi-ply charge 34 may be held by vacuum force against the die face 58.

The alignment mechanisms 66 of the example of FIG. 8 include an alignment shaft 110, oriented transversely, centrally located, and coupled to a pivot rod 116 that is rotatably coupled to the die member 54. The alignment shaft 110 is guided to translate substantially only in the transverse direction by a transverse channel 114. The pivot rod 116 is within a lateral channel 114 configured to constrain the rotational motion of the die member 54 to a longitudinal tilt (rotation around a lateral tilt axis 68). Other alignment mechanisms 66 include mating alignment guides 112 in the form of flat surfaces. Alignment guides 112 also take the form of nesting cylinders, mating grooves and ridges, dovetails, etc. The alignment mechanisms 66 cooperate to constrain the die member 54 to essentially transverse displacement and longitudinal tilt with respect to the die base 62. With this arrangement of alignment mechanisms 66, the conforming die member assembly 78 is configured to substantially resist other relative movements of the die member 54 and the die base 62 (i.e., lateral and longitudinal relative displacement, and/or relative rotation around longitudinal and transverse axes).

Returning to FIGS. 2-7 generally, the forming press 40 may be used to form a longitudinal ridge 18 and a joggle 24 in a multi-ply composite charge 34 without introducing wrinkles in the charge 34 and/or while avoiding wrinkling the charge 34. Methods may comprise inserting the charge 34 between a joggled die 80 and a conforming die 50, and pressing the charge 34 between the dies to form a longitudinal ridge 18 and a joggle 24. The pressing includes applying tension to the charge 34 at the bends 26 of the joggle 24 and around the longitudinal ridge 18, where the tension is sufficient to avoid wrinkles in the charge 34. The pressing may include concurrently forming the longitudinal ridge 18 and the joggle 24. After forming by pressing, the formed charge 34 (the joggled, stiffened composite structure 16) may be cured. Further the joggled, stiffened composite structure 16 may be placed in contact with a skin 14. The skin may be a composite skin and may be cured, partially cured, and/or uncured. The uncured skin 14 may be cured in contact with the cured, joggled, stiffened composite structure 16; the uncured, joggled, stiffened composite structure 16 may be cured in contact with the cured skin 14; the uncured skin 14 may be concurrently cured in contact with the uncured, joggled, stiffened composite structure 16; and/or the cured skin 14 may be bonded to the cured, joggled, stiffened composite structure 16.

This application incorporates by reference for all purposes the following references, which describe methods and apparatuses for forming composite structural members: U.S. Pat. No. 7,708,546 and U.S. Pat. No. 8,557,165.

Illustrative, non-exclusive examples of inventive subject matter according to the present disclosure are described in the following enumerated paragraphs.

A1. A forming press for forming a longitudinal ridge and a joggle that crosses the longitudinal ridge in a multi-ply composite charge, the forming press comprising:

a joggled die with a die face that has a die face longitudinal ridge and a die face joggle that crosses the die face longitudinal ridge;

a conforming die with a series of longitudinally-spaced die fingers and a die support that operatively supports the die fingers, wherein each die finger includes a pair of laterally-spaced die members that is configured to move laterally between a closed position and an open position, each die member configured to tilt longitudinally, and each die member biased toward the joggled die; and a support frame that supports the joggled die and the conforming die;

wherein the forming press is configured to accept a multi-ply composite charge between the joggled die and the conforming die, and to form a composite structure by pressing the multi-ply composite charge between the joggled die and the conforming die.

A2. The forming press of paragraph A1, wherein the forming press is configured to form the longitudinal ridge and the joggle without wrinkles and/or without wrinkling the multi-ply composite charge.

A3. The forming press of any of paragraphs A1-A2, wherein the forming press is configured to concurrently form the joggle and the longitudinal ridge in the multi-ply composite charge.

A4. The forming press of any of paragraphs A1-A3, wherein the forming press is configured to avoid wrinkling the multi-ply composite charge while pressing the multi-ply composite charge between the joggled die and the conforming die, optionally to avoid wrinkling in proximity of the die face joggle, and optionally to avoid wrinkling in proximity of the die face longitudinal ridge.

A5. The forming press of any of paragraphs A1-A4, wherein the forming press is configured to apply tension to the multi-ply composite charge in proximity of the die face joggle, and optionally in proximity of the die face longitudinal ridge.

A6. The forming press of any of paragraphs A1-A5, wherein the die face joggle includes two local, lateral changes in contour of opposite directions and wherein the forming press is configured to apply tension to the multi-ply composite charge in proximity of each of the local, lateral changes in contour.

A7. The forming press of any of paragraphs A1-A6, wherein the die face joggle includes two local, lateral bends of opposite directions, and wherein the forming press is configured to apply tension to the multi-ply composite charge in proximity of each of the local, lateral bends.

A8. The forming press of any of paragraphs A1-A7, wherein the composite structure is a joggled and/or stiffened composite structure.

A9. The forming press of any of paragraphs A1-A8, wherein the composite structure has a predetermined cross-sectional profile substantially defined by the joggled die and the conforming die.

A9.1. The forming press of paragraph A9, wherein the cross-sectional profile is a hat profile.

A9.2. The forming press of any of paragraphs A9-A9.1, wherein the cross-sectional profile is a flanged, open trapezoidal profile.

A10. The forming press of any of paragraphs A1-A9.2, wherein the composite structure includes a composite structure longitudinal ridge, optionally with two spaced-apart side walls.

A11. The forming press of any of paragraphs A1-A10, wherein the composite structure includes two longitudinal flanges, optionally along opposite edges of a/the composite structure longitudinal ridge.

A12. The forming press of any of paragraphs A1-A11, wherein the wherein the composite structure is elongated.

A13. The forming press of any of paragraphs A1-A12, wherein the composite structure is a stringer, a frame member, a spar, a rib, a beam, and/or a support.

A14. The forming press of any of paragraphs A1-A13, wherein the forming press is configured to form the multi-ply composite charge into a predetermined cross-sectional profile substantially defined by the joggled die and the conforming die.

A14.1. The forming press of paragraph A14, wherein the cross-sectional profile is a hat profile.

A14.2. The forming press of any of paragraphs A14-A14.1, wherein the cross-sectional profile is a flanged, open trapezoidal profile.

A15. The forming press of any of paragraphs A1-A14.2, wherein the longitudinal ridge formed in the multi-ply composite charge includes two spaced-apart side walls.

A16. The forming press of any of paragraphs A1-A15, wherein the formed multi-ply composite charge includes two longitudinal flanges, optionally along opposite edges of the longitudinal ridge formed in the multi-ply composite charge.

A17. The forming press of any of paragraphs A1-A16, wherein the multi-ply composite charge is elongated.

A18. The forming press of any of paragraphs A1-A17, wherein the multi-ply composite charge includes, optionally is, an uncured composite material, a green composite material, a partially-cured composite material, and/or a prepreg composite material.

A19. The forming press of any of paragraphs A1-A18, wherein the multi-ply composite charge includes fiber-reinforced composite plies A20. The forming press of any of paragraphs A1-A19, wherein the multi-ply composite charge includes carbon fiber, aramid fiber, and/or glass fiber.

A21. The forming press of any of paragraphs A1-A20, wherein the die face joggle is a transverse offset, optionally a transverse offset in a plane surface of the die face.

A22. The forming press of any of paragraphs A1-A21, wherein the die face joggle and/or the joggle has a joggle offset that is less than 15 mm, less than 10 mm, less than 8 mm, less than 6 mm, less than 5 mm, less than 4 mm, less than 3 mm, less than 2 mm, greater than 0.5 mm, greater than 1 mm, greater than 2 mm, greater than 3 mm, greater than 4 mm, greater than 5 mm, greater than 6 mm, greater than 8 mm, and/or greater than 10 mm.

A23. The forming press of any of paragraphs A1-A22, wherein the die face joggle and/or the joggle has a joggle length that is less than 300 mm, less than 200 mm, less than 150 mm, less than 100 mm, less than 80 mm, less than 50 mm, greater than 20 mm, greater than 50 mm, greater than 80 mm, greater than 100 mm, and/or greater than 150 mm.

A24. The forming press of any of paragraphs A1-A23, wherein the die face of the joggled die is configured to release the multi-ply composite charge after pressing in the forming press.

A25. The forming press of any of paragraphs A1-A24, wherein at least a portion of the die face of the joggled die is gas permeable and/or porous.

A26. The forming press of any of paragraphs A1-A25, wherein the die face of the joggled die is configured to hold the multi-ply composite charge with vacuum force.

A27. The forming press of any of paragraphs A1-A26, wherein the joggled die includes a vacuum port fluidically connected to the die face of the joggled die.

A28. The forming press of any of paragraphs A1-A27, wherein the die face longitudinal ridge of the joggled die includes two spaced-apart sides.

A29. The forming press of any of paragraphs A1-A28, wherein each die finger is configured to conform, in longitudinal tilt and transverse displacement, to a local surface of the joggled die when the multi-ply composite charge is pressed between the joggled die and the conforming die.

A30. The forming press of any of paragraphs A1-A29, wherein each die member is coupled to an alignment mechanism configured to substantially constrain angular motion of the die member to longitudinal tilt.

A31. The forming press of any of paragraphs A1-A30, wherein each die member is coupled to an alignment mechanism configured to substantially constrain relative motion between the die member and a die base and/or the die support to transverse displacement.

A32. The forming press of any of paragraphs A1-A31, wherein each die member is configured to tilt longitudinally at an angle having an absolute value of less than 2°, less than 3°, less than 4°, less than 5°, less than 7°, less than 10°, greater than 1°, greater than 2°, greater than 3°, greater than 4°, and/or greater than 5°.

A33. The forming press of any of paragraphs A1-A32, wherein the die support is elastically, laterally coupled to each die finger.

A34. The forming press of any of paragraphs A1-A33, wherein the conforming die includes a lateral coupler that operatively couples one die member of the pair of die members of at least one of the die fingers to the die support, optionally wherein the lateral coupler is a spring.

A35. The forming press of any of paragraphs A1-A34, wherein the conforming die includes a first lateral coupler that operatively couples one die member of the pair of die members of at least one of the die fingers to the die support, and a second lateral coupler that operatively couples the other die member of the pair of die members of at least one of the die fingers to the die support, optionally wherein the first lateral coupler and/or the second lateral coupler is a spring.

A36. The forming press of any of paragraphs A1-A35, wherein each of the die fingers is configured to laterally translate the die members from the closed position to the open position in response to pressing the multi-ply composite charge between the joggled die and the conforming die.

A37. The forming press of any of paragraphs A1-A36, wherein the conforming die includes a die base coupled to the die support and configured to support at least one die member.

A37.1. The forming press of paragraph A37, wherein the die base is configured to translate laterally, optionally to translate laterally in response to pressing the multi-ply composite charge between the joggled die and the conforming die.

A37.1.1. The forming press of paragraph A37.1, wherein the conforming die includes a lateral coupler that couples the die base to the die support, optionally wherein the lateral coupler is a spring.

A37.2. The forming press of any of paragraphs A37-A37.1.1, wherein the die base is coupled to one die member of the pair of die members of each die finger.

A37.3. The forming press of any of paragraphs A37-A37.2, wherein the conforming die includes at least two die bases, wherein, for each die finger, each die member is coupled to a different die base.

A37.3.1. The forming press of paragraph A37.3, wherein the conforming die includes a lateral coupler that couples the at least two die bases together, optionally wherein the lateral coupler is a spring.

A37.4. The forming press of any of paragraphs A37-A37.3.1, wherein the conforming die includes at least two die bases, wherein one die member of the pair of die members of each die finger is coupled to one of the die bases and the other die member of the pair of die members is coupled to another of the die bases.

A37.4.1. The forming press of paragraph A37.4, wherein the conforming die includes a lateral coupler that couples the at least two die bases together, optionally wherein the lateral coupler is a spring.

A37.5. The forming press of any of paragraphs A37-A37.4.1, wherein the conforming die includes one die base for each die member, with each die base coupled to a different die member.

A37.6. The forming press of any of paragraphs A37-A37.5, wherein at least one die member is elastically coupled to the die base.

A37.7. The forming press of any of paragraphs A37-A37.6, wherein the conforming die includes a spring that couples at least one of the die members to the die base, optionally wherein the conforming die includes a pair of springs that couple at least one of the die members to the die base.

A38. The forming press of any of paragraphs A1-A37.7, wherein, for each pair of die members, the die members are further away from each other in the open position than in the closed position.

A39. The forming press of any of paragraphs A1-A38, wherein the conforming die has a closed position in which each pair of die members is in the closed position, and an open position in which each pair of die members is in the open position.

A40. The forming press of any of paragraphs A1-A39, wherein each die member of each pair of die members is configured and to move laterally between a closed position and an open position corresponding to the closed position and the open position of the respective pair of die members.

A41. The forming press of any of paragraphs A1-A40, wherein each pair of die members in the open position forms a recess between the die members that is configured to accept the multi-ply composite charge in contact with the die face longitudinal ridge of the joggled die.

A41.1. The forming press of paragraph A41, wherein the pair of die members of at least one of the die fingers is configured to self-center around the die face longitudinal ridge of the joggled die when the die face longitudinal ridge enters the recess.

A42. The forming press of any of paragraphs A1-A41.1, wherein, for each die finger, the die members of the pair of die members are biased toward each other.

A43. The forming press of any of paragraphs A1-A42, wherein, for each die finger, the die members of the pair of die members are biased toward the closed position.

A44. The forming press of any of paragraphs A1-A43, wherein each die member has a longitudinal width.

A44.1. The forming press of paragraph A44, wherein the longitudinal width of each die member is substantially the same.

A44.2. The forming press of any of paragraphs A44-A44.1, wherein the longitudinal width is substantially less than a joggle length of the joggle, optionally less than 50%, less than 30%, less than 20%, less than 15%, less than 10%, greater than 5%, greater than 10%, greater than 15%, and/or greater than 20% of the joggle length of the joggle.

A44.3. The forming press of any of paragraphs A44-A44.2, wherein the longitudinal width is at least 10 mm, at least 15 mm, at least 20 mm, at least 25 mm, at least 30 mm, at least 40 mm, at least 50 mm, at most 100 mm, at most 80 mm, at most 50 mm, at most 40 mm, and/or at most 30 mm.

A45. The forming press of any of paragraphs A1-A44.3, wherein the conforming die includes at least 4, at least 5, at least 6, at least 7, at least 8, at least 10, at least 20, at most 50, at most 40, at most 30, at most 20, and/or at most 10 die fingers.

A46. The forming press of any of paragraphs A1-A45, wherein at least one die member includes a joggled die guide.

A46.1. The forming press of paragraph A46, wherein the joggled die guide tapers away from a die face of the die member.

A46.2. The forming press of any of paragraphs A46-A46.1, wherein the die face longitudinal ridge of the joggled die includes two spaced-apart sides, and wherein the joggled die guide is configured to oppose one of the sides when the multi-ply composite charge is pressed between the joggled die and the conforming die.

A46.3. The forming press of any of paragraphs A46-A46.2, wherein the longitudinal ridge formed in the multi-ply composite charge includes two spaced-apart side walls, and wherein the joggled die guide is configured to form a portion of one of the side walls.

A46.4. The forming press of any of paragraphs A46-A46.3, wherein a profile of the die member is a corner-notched rectangle with the joggled die guide corresponding to the corner notch.

A47. The forming press of any of paragraphs A1-A46.4, wherein at least one die member, optionally each die member, includes a die face.

A47.1. The forming press of paragraph A47, wherein the die face of the die member is configured to release the multi-ply composite charge after pressing in the forming press.

A47.2. The forming press of any of paragraphs A47-A47.1, wherein at least a portion of the die face of the die member is gas permeable and/or porous.

A47.3. The forming press of any of paragraphs A47-A47.2, wherein the die face of the die member is configured to hold the multi-ply composite charge with vacuum force.

A47.4. The forming press of any of paragraphs A47-A47.3, wherein the die member includes a vacuum port fluidically connected to the die face of the die member.

A47.5. The forming press of any of paragraphs A47-A47.4, wherein the die face of the die member is configured to form a longitudinal flange in the multi-ply composite charge, optionally wherein the longitudinal flange is at an edge of the longitudinal ridge formed in the multi-ply composite charge.

A48. The forming press of any of paragraphs A1-A47.5, further comprising an actuator configured to urge the joggled die and the conforming die together and to press the multi-ply composite charge between the joggled die and the conforming die.

A49. The forming press of any of paragraphs A1-A48, wherein the conforming die includes at least one of the die member assemblies of any of paragraphs C1-C9.

B1. A method of forming a longitudinal ridge and a joggle that crosses the longitudinal ridge in a multi-ply composite charge, the method comprising:

inserting a multi-ply composite charge between a joggled die and a conforming die, wherein the joggled die has a die face with a die face longitudinal ridge and a die face joggle that crosses the die face longitudinal ridge, wherein the die face joggle includes two local, lateral contour changes of opposite directions or includes two local, lateral bends of opposite directions;

pressing the multi-ply composite charge between the joggled die and the conforming die to form a longitudinal ridge and a joggle that crosses the longitudinal ridge;

wherein the pressing includes applying tension to the multi-ply composite charge at the local, lateral contour changes or the local, lateral bends of the joggled die sufficient to avoid wrinkles in the multi-ply composite charge while pressing.

B2. The method of paragraph B1, wherein the inserting includes inserting the multi-ply composite charge into the forming press of any of paragraphs A1-A46.

B3. The method of any of paragraphs B1-B2, wherein the joggled die is the joggled die of any of paragraphs A1-A46.

B4. The method of any of paragraphs B1-B3, wherein the conforming die is the conforming die of any of paragraphs A1-A46.

B5. The method of any of paragraphs B1-B4, wherein the pressing includes pressing with the forming press of any of paragraphs A1-A46.

B6. The method of any of paragraphs B1-B5, wherein the pressing concurrently forms the longitudinal ridge and the joggle.

B7. The method of any of paragraphs B1-B6, further comprising curing the multi-ply composite charge after the pressing.

B8. The method of any of paragraphs B1-B7, further comprising, after the pressing, contacting the multi-ply composite charge to a skin with a joggle detail that mates to the joggle formed in the multi-ply composite charge.

B8.1. The method of paragraph B8, further comprising curing the skin and the multi-ply composite charge concurrently.

B9. The use of the forming press of any of paragraphs A1-A46 to form a multi-ply composite charge with a longitudinal ridge and a joggle that crosses the longitudinal ridge.

C1. A conforming die member assembly, comprising:

a die member with a die face and a joggled die guide tapering from the die face;

a die base elastically coupled to the die member, opposite the die face, with a spring; and an alignment mechanism that extends along a transverse axis between the die member and the die base and that is coupled to the die member and the die base;

wherein the die member is configured to tilt, relative to the die base, around a lateral axis, perpendicular to the transverse axis, and to translate, relative to the die base, along an axis parallel to the transverse axis.

C2. The assembly of paragraph C1, wherein the conforming die member assembly is configured to form a portion of the conforming die of any of paragraphs A1-A46.

C3. The assembly of any of paragraphs C1-C2, wherein the spring biases the die member and the die base away from one another.

C4. The assembly of any of paragraphs C1-C3, wherein the die face is gas permeable and/or porous.

C5. The assembly of any of paragraphs C1-C4, wherein the die face is configured to hold a multi-ply composite charge with vacuum force.

C6. The assembly of any of paragraphs C1-C5, wherein the die member includes a vacuum port fluidically connected to the die face.

C7. The assembly of any of paragraphs C1-C6, wherein the die member is configured to tilt, relative to the die base, at an angle having an absolute value of less than 2°, less than 3°, less than 4°, less than 5°, less than 7°, less than 10°, greater than 1°, greater than 2°, greater than 3°, greater than 4°, and/or greater than 5°.

C8. The assembly of any of paragraphs C1-C7, wherein the alignment mechanism is at least one of an alignment shaft, an alignment pin, an alignment tab, and an alignment guide.

C9. The assembly of any of paragraphs C1-C8, wherein a profile of the die member is a corner-notched rectangle with the joggled die guide corresponding to the corner notch.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of apparatuses and steps of methods disclosed herein are not required of all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

In the event that any patents or patent applications are incorporated by reference herein and (1) define a term in a manner and/or (2) are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

The invention claimed is:

1. A forming press for forming a longitudinal ridge and a joggle that crosses the longitudinal ridge in a multi-ply composite charge, the forming press comprising:
   a joggled die with a die face that has a die face longitudinal ridge and a die face joggle that crosses the die face longitudinal ridge;
   a conforming die with a series of longitudinally-spaced die fingers and a die support that operatively supports the die fingers, wherein each die finger includes a pair of laterally-spaced die members that is configured to move laterally between a closed position and an open position, each die member configured to tilt longitudinally, and each die member biased toward the joggled die; and
   a support frame that supports the joggled die and the conforming die;
   wherein the forming press is configured to accept a multi-ply composite charge between the joggled die and the conforming die, and to form a composite structure by pressing the multi-ply composite charge between the joggled die and the conforming die.

2. The forming press of claim 1, wherein the forming press is configured to concurrently form the joggle and the longitudinal ridge in the multi-ply composite charge.

3. The forming press of claim 1, wherein each die finger is configured to conform, in longitudinal tilt and transverse displacement, to a local surface of the joggled die when the multi-ply composite charge is pressed between the joggled die and the conforming die.

4. The forming press of claim 1, wherein each die member is coupled to an alignment mechanism configured to substantially constrain angular motion of the die member to longitudinal tilt.

5. The forming press of claim 1, wherein the die face joggle has a joggle offset that is less than 10 mm, and wherein the die face joggle has a joggle length that is less than 150 mm.

6. The forming press of claim 1, wherein at least a portion of the die face of the joggled die is porous, and wherein the die face of the joggled die is configured to hold the multi-ply composite charge with vacuum force.

7. The forming press of claim 1, wherein each die member is configured to tilt longitudinally at an angle having an absolute value of less than 5°.

8. The forming press of claim 1, wherein the die support is elastically, laterally coupled to each die finger.

9. The forming press of claim 1, wherein the conforming die includes one die base for each die member, with each die base coupled to a different die member, wherein each die base is coupled to the die support and configured to support at least one die member.

10. The forming press of claim 1, wherein the conforming die includes a die base coupled to the die support and configured to support at least one die member, and wherein the at least one die member is elastically coupled to the die base.

11. The forming press of claim 1, wherein the conforming die includes a die base coupled to the die support and configured to support at least one die member, and wherein the conforming die includes a spring that couples the at least one die member to the die base.

12. The forming press of claim 1, wherein, for each die finger, the die members of the pair of die members are biased toward the closed position.

13. The forming press of claim 1, wherein the conforming die includes at least 6 die fingers.

14. The forming press of claim 1, wherein the longitudinal ridge formed in the multi-ply composite charge includes two spaced-apart side walls, and wherein at least one die member includes a joggled die guide that is configured to form a portion of one of the side walls.

15. The forming press of claim 1, wherein each die member includes a die face that is configured to release the multi-ply composite charge after pressing in the forming press.

16. The forming press of claim 1, wherein each die member includes a die face, wherein at least a portion of the die face of each die member is porous and configured to hold the multi-ply composite charge with vacuum force.

17. A forming press for concurrently forming a longitudinal ridge and a joggle that crosses the longitudinal ridge in a multi-ply composite charge, the forming press comprising:
   a joggled die with a die face that has a die face longitudinal ridge and a die face joggle that crosses the die face longitudinal ridge;
   a conforming die with a series of longitudinally-spaced die fingers and a die support that operatively supports the die fingers, wherein each die finger includes a pair of laterally-spaced die members that is configured to move laterally between a closed position and an open position, each die member configured to tilt longitudinally, and each die member biased toward the joggled die, and wherein, for each die finger, the die members of the pair of die members are biased toward each other and the die members are further away from each other in the open position than in the closed position; and
   a support frame that supports the joggled die and the conforming die;
   wherein the forming press is configured to accept a multi-ply composite charge between the joggled die and the conforming die, and to form a composite structure by pressing the multi-ply composite charge between the joggled die and the conforming die;
   wherein the forming press is configured to apply tension to the multi-ply composite charge in proximity of the die face joggle and in proximity of the die face longitudinal ridge.

18. The forming press of claim 17, wherein each pair of die members in the open position forms a recess between the die members that is configured to accept the multi-ply composite charge in contact with the die face longitudinal ridge of the joggled die.

19. The forming press of claim 17, wherein each die member includes a die face, wherein at least a portion of each die face is porous and configured to hold the multi-ply composite charge with vacuum force.

20. A conforming die member assembly, comprising:
   a die member with a die face and a joggled die guide tapering from the die face, wherein the die face is configured to hold a multi-ply composite charge with vacuum force;
   a die base elastically coupled to the die member, opposite the die face, with a spring that biases the die member and the die base away from one another; and an alignment mechanism that extends along a transverse axis between the die member and the die base and that is coupled to the die member and the die base;

wherein the die member is configured to tilt, relative to the die base, around a lateral axis, perpendicular to the transverse axis, and to translate, relative to the die base, along an axis parallel to the transverse axis, and wherein the die member is configured to tilt, relative to the die base, at an angle having an absolute value of less than 5°.

* * * * *